United States Patent [19]
Thomson

[11] 4,266,396
[45] May 12, 1981

[54] IMPROVEMENTS IN AND RELATING TO ROPES

[75] Inventor: Ian M. Thomson, Wokingham, England

[73] Assignee: Cable Belt, Ltd., Edinburgh, Scotland

[21] Appl. No.: 103,945

[22] PCT Filed: Jun. 1, 1979

[86] PCT No.: PCT/GB78/00019
§ 371 Date: Jun. 5, 1979
§ 102(e) Date: Jun. 1, 1979

[87] PCT Pub. No.: WO79/00182
PCT Pub. Date: Apr. 19, 1979

[30] Foreign Application Priority Data
Oct. 5, 1977 [GB] United Kingdom ............... 41301/77

[51] Int. Cl.³ ............................................ D07B 1/16
[52] U.S. Cl. ........................................... 57/221; 57/7; 57/295
[58] Field of Search ................. 57/210, 211, 212, 217, 57/218, 221, 223, 231, 232, 241, 250, 257, 258, 295, 3, 7, 13, 214, 220

[56] References Cited
U.S. PATENT DOCUMENTS

| | | | |
|---|---|---|---|
| 3,131,530 | 5/1964 | Dietz ...................................... | 57/221 |
| 3,395,530 | 8/1968 | Campbell ........................... | 57/232 X |
| 3,534,542 | 10/1970 | West ...................................... | 57/221 |
| 3,601,970 | 8/1971 | Roberts et al. ........................ | 57/217 |
| 4,022,010 | 5/1977 | Gladenbeck et al. .................. | 57/231 |

Primary Examiner—Donald Watkins

[57] ABSTRACT

The invention relates to wire ropes.

There is disclosed a wire rope comprising a plurality of strands (4–12) twisted together with each strand (4–12) being individually covered by a respective sheath (16) of rubber or rubber substitute. Each strand (4–12) comprises a plurality of wires (14) twisted together with the direction of twist of at least the outer wires (14) in each strand (4–12) being opposite to the direction of twist of at least the outer wires (14) in the strands (4–12) adjacent to it, the rope having an outer covering sheath (18) of rubber or rubber substitute.

In this way, the wires (14) of adjacent strands (4–12) do not cross each other, and stress on them is reduced.

2 Claims, 3 Drawing Figures

IMPROVEMENTS IN AND RELATING TO ROPES

The invention relates to ropes, such as wire ropes. More specifically, the invention is concerned with the manner in which the strands of a wire rope are twisted or "laid" in relation to each other.

According to the invention, there is provided a wire rope, comprising a plurality of strands twisted together, each strand comprising a plurality of wires twisted together, characterised in that the direction of twist of at least the outer wires in each of at least some of the strands is opposite to the direction of twist of at least the outer wires in the strands adjacent to it, the rope having an outer covering sheath of rubber or rubber substitute.

A wire rope embodying the invention will now be described, by way of example only, with reference to the accompanying diagrammatic drawing in which.

Figure 2:
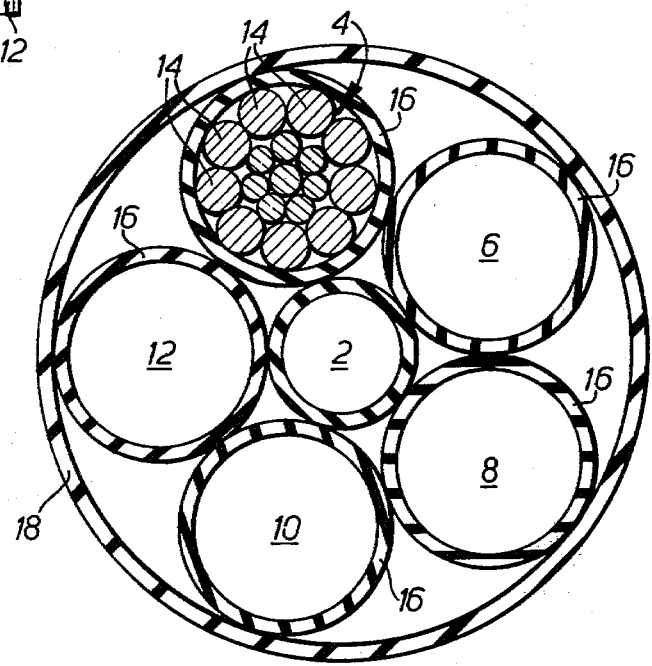
FIG. 2 is a cross-section (to an enlarged scale as compared with FIG. 1) through the complete rope on a line corresponding to the line II—II of FIG. 1.

As shown in FIG. 2, the rope has a central or core strand 2 and five outer strands 4, 6, 8, 10 and 12. Each strand is made up of a plurality of wires 14 which are twisted around each other (the wires 14 may be arranged in inner and outer layers around a single central or core wires as shown for the strand 4, in FIG. 2, the wires of the other strands being omitted).

Each strand is covered with its own individual sheath 16 made of rubber or similar suitable material.

The strands 4 to 12 are then twisted around the core strand 2 in the manner shown in FIG. 2, and to be explained in more detail with reference to FIG. 1. Finally, the entire rope is covered with an outer sheath 18 of rubber or suitable similar material.

Figure 1:
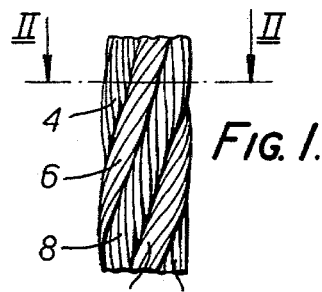
FIG. 1 is a diagrammatic side view of part of the rope (with covering sheaths removed as will be explained)

FIG. 1 illustrates the rope but with the individual sheaths 16 and the outer sheath 18 removed so as to show the direction of twist of the outer wires of each strand.

As shown, the direction of twist of the outer wires of adjacent strands is opposite. Thus, the direction of twist of the outer wires of the strands 4, 8, 12 is opposite to that of the direction of twist of the outer wires of the strands 6 and 10.

Figure 3:
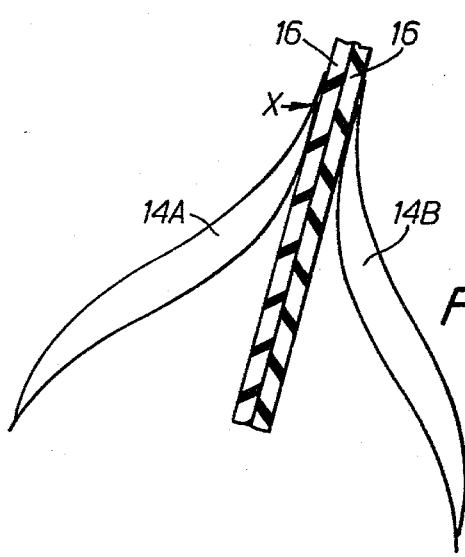
FIG. 3 is a diagrammatic view showing part of the rope (in the form shown in FIG. 2) in more detail and to an enlarged scale as compared with FIG. 1.

As stated above, FIG. 1 is merely diagrammatic and, in the final construction, all the strands are covered by the sheaths 16 and the whole rope is covered by the outer sheath 18. FIG. 1 illustrates how the outer wires of each pair of adjacent strands physically relate (via the intermediary of the sheaths 16, not shown in FIG. 1, between them) to each other. FIG. 3 illustrates part of two adjacent wires 14A, 14B (see FIG. 1), wire 14A being a wire of strand 4 and wire 14B being a wire of strand 6 as indicated in FIG. 1. As is apparent in FIG. 3, in the region X, where the two wires 14A, 14B are closest to each other (being separated only by the respective rubber sheaths 16 over the two strands 4 and 6), the wires 14A and 14B are substantially parallel to each other. This arrangement is advantageous in that the region X the wires do not actually pass across each other at an angle to each other and stress on the wires and on the rubber sheaths between them is reduced, particularly when the rope is under tension. The construction can substantially increase the fatigue life of the rope.

I claim:

1. A wire rope, comprising
    a plurality of strands twisted together, each strand comprising a plurality of wires twisted together,
    the direction of twist of at least the outer wires in at least some of the strands being opposite to the direction of twist of at least the outer wires in the strands adjacent thereto
    an outer sheath of rubber or rubber substitute covering all the strands together, and
    a strand sheath of rubber or rubber substitute covering each strand individually,
    whereby adjacent wires of adjacent strands extend substantially parallel to one another with respective strand sheaths therebetween to reduce stress between the wires.

2. A method of making a wire rope comprising the steps of
    (a) making-up a wire strand by twisting a plurality of wires together and by giving at least the outer wires of the strand a predetermined direction of twist,
    (b) making-up further wire strands by repeating step (a) but varying the direction of twist of at least the outer wires of some of the strands so that for said some of the strands the direction of twist is opposite to the said predetermined direction,
    (c) covering each strand with an individual sheath of rubber or rubber substitute,
    (d) selecting one of the strands as a core strand,
    (e) arranging the remaining strands around the core strand and twisting them therearound, the arrangement being such that the direction of twist of at least the outer wires of at least some of the remaining strands is opposite to the direction of twist of at least the outer wires in the strands adjacent thereto, and then
    (f) covering the twisted strands with an outer sheath of rubber or rubber substitute,
    whereby adjacent wires of adjacent strands extend substantially parallel to one another with respective strand sheaths therebetween to reduce stress between the wires.

* * * * *